July 25, 1967 E. SCHÜLLER ETAL 3,332,635
DRIVE FOR TAPE UTILIZING DEVICES
Filed Feb. 14, 1964
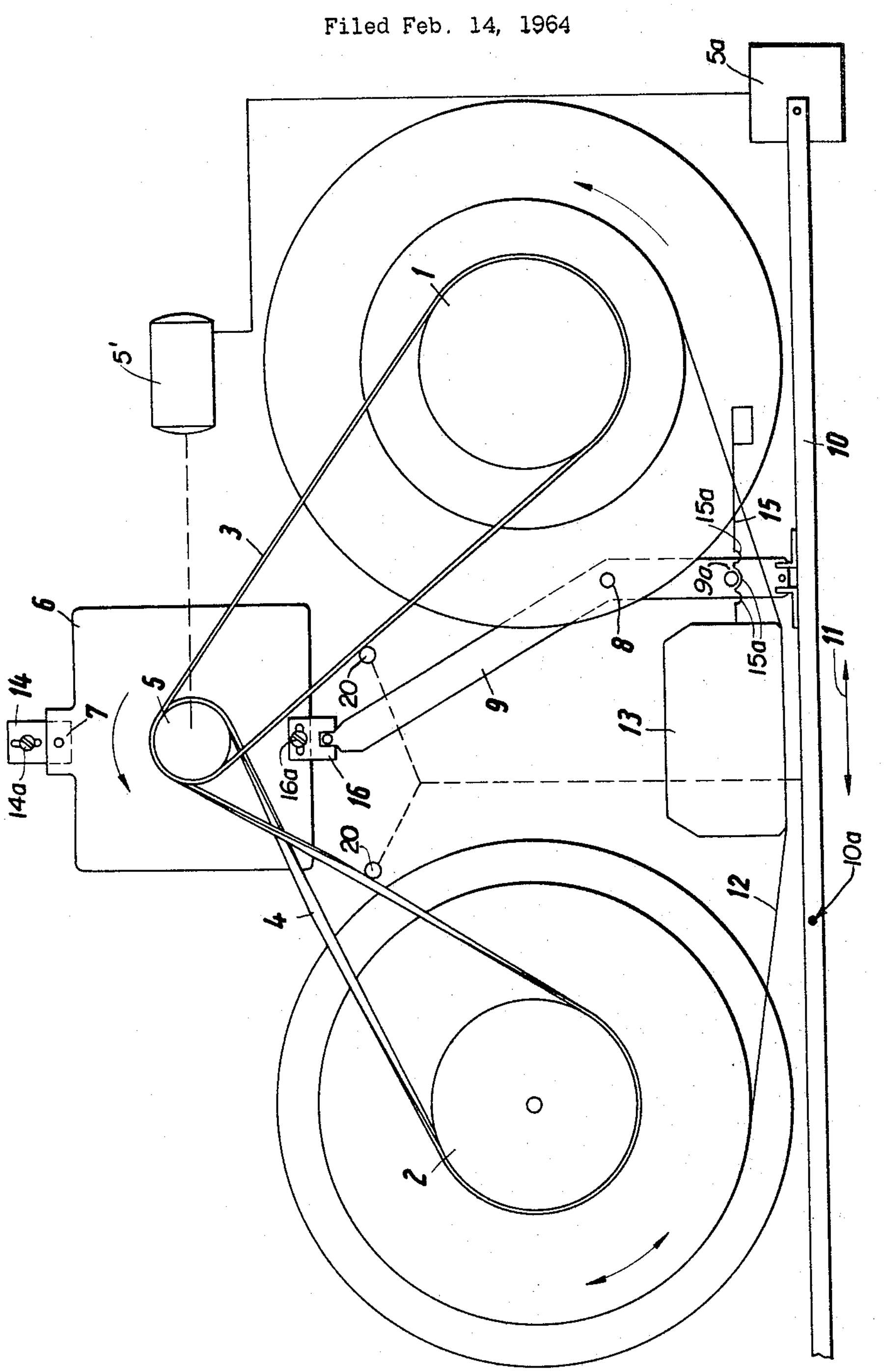
INVENTORS
Eduard Schüller &
Rolf Schwabe
BY Spencer & Kaye
ATTORNEYS 3,332,635

DRIVE FOR TAPE UTILIZING DEVICES

Eduard Schüller, Wedel, Holstein, and Rolf Schwabe, Hannover, Germany, assignors to Telefunken Patentverwertungsgesellschaft m.b.H., Elisabethenstrasse, Germany Filed Feb. 14, 1964, Ser. No. 344,935
Claims priority, application Germany, Feb. 15, 1963, T 23,477
9 Claims. (Cl. 242—55.12)

The present invention relates to a drive for use in magnetic tape recorders or the like, the term "tape recorder," as used throughout the instant specification and claims, being intended to comprehend any piece of equipment which makes use of a tape-like record carrier.

Tape recorders equipped with a single-motor drive assembly are conventionally provided with a driving connection between the motor and the takeup reel by means of which the takeup reel is, during normal operation, driven with such a moment as to wind up on the takeup reel the tape which is advanced at a constant rate by the capstan or other tape feeding mechanism, without, however, exerting an excessive pull on the tape. Such driving connections are usually established by means of belts or by means of a friction-disc type coupling; if belts are used, the frictional effect is established by making the belts not too tight so that they can slip on their pulleys, while in the case of the friction-disc type coupling, the frictional force is established by a weight. The supply or payoff reel is braked, for example, by means of a further weight-dependent friction-disc arrangement, as a result of which a constant braking moment is exerted on the payoff reel.

For "fast forward" or "fast rewind," tape recorders equipped with a single-motor drive assembly are conventionally provided with additional driving connections which can selectively couple the motor with the proper transmission ratio, to either of the two reels.

It is an object of the present invention to simplify the reel drive of a magnetic tape recorder equipped with a single-motor driving assembly and a slipping belt-type connection between the driving shaft and the takeup reel, and this object is, according to the present invention, accomplished by providing a further slipping belt-type connection between the driving shaft and the payoff reel, which further belt connection is so arranged as to transmit to the payoff reel a moment which is opposite to the direction in which the payoff reel rotates while unwinding the tape. Moreover, means are provided for tensioning the transmission belts, these means being coupled with the selector organ of the tape recorder, i.e., with the mechanism by which the tape recorder can be set into its various operative positions, in such a manner that during normal forward operation, i.e., during normal play-back or record, the belts are but slightly tensioned, i.e., kept relatively loose or slack, while during the fast forward or fast rewind, the belt coupled to the particular reel onto which the tape is being wound is fully tensioned whereas the belt coupled to the reel from which tape is being fed is not under tension, or only under slight tension.

More particularly, the present invention resides in a reel drive which is usable with a magnetic tape recorder which has a single-motor drive assembly and is equipped with a payoff and takeup reel and which has a "normal forward" position for recording or playing back, a fast forward position for winding the tape from the payoff reel to the takeup reel, and a fast rewind position for rapidly rewinding the tape from the takeup reel to the payoff reel. This reel drive includes the drive shaft driven by the motor and transmission including the above-described two belts for power-transmittingly connecting the drive shaft with the two reels. The two belts are connected with the reels to exert thereon rotational moments acting in opposite direction, and the transmission as a whole is capable of assuming three positions corresponding to the above-mentioned normal forward, fast forward and fast rewind positions of the tape recorder. When the tape recorder is in its normal forward position, the two belts are weakly tensioned thereby to provide enough pull and braking on the tape to maintain the same taut. When the recorder is in its fast forward position, the belt connected to the takeup reel is tight, thereby to establish the substantially slippage-free driving connection between the takeup reel and the drive shaft, while the other belt is now tensioned less than it was while the tape recorder was in its normal forward position. Finally, when the tape recorder is in its fast rewind position, the belt connected to the payoff reel—the latter now actually being the reel onto which tape is wound—is made tight, thereby to establish the substantially slippage-free driving connection between the payoff reel and the drive shaft, while the belt connected to the takeup reel—the same now having the tape unwound from it—is tensioned less than it was while the tape recorder was in its normal forward position.

Thanks to such an arrangement, the same driving means are used for winding in both forward as well as reverse directions. Very few structural elements are required, since all that is required are the two belts together with the mechanism for varying the tension thereon. During normal forward operation, the weak tensioning of the takeup reel is sufficient to maintain the necessary pull on the tape, while during fast winding from one of the reels to the other, i.e., during fast forward or fast rewind, one of the belts is used for driving the reel onto which tape is wound while the other belt may be kept more loose but still sufficiently taut to act as a brake.

Additional objects and advantages of the present invention will become apparent upon consideration of the following description when taken in conjunction with the accompanying drawings in which the single figure is a plan view of a drive according to the present invention.

Referring now to the drawing, the same shows two reels 1 and 2 of a tape recorder, the same being connectible, via drive belts 3 and 4, respectively, to the drive shaft 5 of a motor 5'. For the sake of consistency, the right-hand reel 1 will hereinafter be considered the takeup reel while the left-hand reel 2 will be considered the payoff reel; this terminology will be retained even for purposes of describing the rewinding operation during which tape is actually unwound from the reel normally considered the takeup reel and the payoff reel is the one onto which tape is actually being wound. The drive belt 4 is crossed so that the drive shaft 5, which is driven in one direction only, will exert opposite moments of rotation on the two reels. The shaft 5 is arranged symmetrically between the two reels and is mounted on a carrier 6 which itself is mounted for pivotable movement about an axle 7, which is parallel to the axes of the reels, so that the tension on the belts 3 and 4, i.e., their looseness or tightness, can be varied by pivoting the carrier 6 about the axle 7.

Suitable means are provided for pivoting the carrier, these means including a two-armed lever 9, mounted for pivoting about an axle 8, the upper end of the lever 9 (as viewed in the drawing) engaging the carrier 6 at a point opposite the axle 7. The other end of the lever 9 is connected to a slide 10 which is laterally displaceable out to its center position illustrated in the drawing, in either direction as indicated by the double arrow 11.

In this way, the carrier 6 together with the shaft 5 can be swung to the right or left. The slide 10 can be coupled to suitable keys or pushbuttons which move the slide. Alternatively, the slide has associated with it a suitable indexing mechanism—to be described below—which fixes the various operative positions of the slide, in which case the slide may carry a suitable setting knob and itself serve as a control organ.

Essentially, the slide will have three definite positions, each of which may be fixed by the indexing mechanism. The slide can be made to occupy the middle position, which is the position shown in the drawing, during the off position of the tape recorder as well as during normal forward operation of the recorder. In practice, the tape recorder can be switched between these two positions, in both of which the slide 10 will occupy the mentioned central position, by means of an additional selector switch for stopping the rotation of the shaft 5. This can be effected by means of a separate element, or, if desired, the slide 10 itself can be made to act as this selector switch if the slide 10 is mounted for pivotal movement about an axis 10*a* lying at right angles to the direction of the length of the slide so that this pivotal movement can be utilized for switching the shaft 5 on or off, such as by actuating a switch 5*a* connected to the motor 5'. All that is important, however, is that the slide 10 remain in a longitudinal position corresponding essentially to the central position.

In this central position of the slide 10, the tension of the two belts 3 and 4 is relatively slight, the actual tape feed mechanism (not shown) being switched on. The tension of the belts 3 and 4 can be adjusted by means of tensioning levers, but it is simpler if the tension is adjusted by making the distance between the axis of the shaft 5 and the axis of each of the reels 1 and 2 such that the belts 3 and 4 have a slight initial tension. In order to allow this tension to be adjusted, the carrier is mounted on the chassis of the tape recorder (not shown) via a connector 14 which has an elongated slot so that by loosening the screw 14*a* passing through the slot, the carrier 6 can be moved, within certain limits, in a direction transverse with respect to the reels. The belt 3 can be tensioned somewhat more than belt 4 so as to produce the somewhat higher initial tension on the reel 1, the latter being, in normal forward operation during recording or playing back, the takeup reel, as explained above. This adjustment can be made while the lever 9 is in its center position, in which a pin 9*a* on the lever engages the central bend of three such bends 15*a* of an indexing spring 15, by moving a contact element 16, the same being mounted on the carrier 6 and being provided with a transverse elongated slot. As shown in the drawing, the contact element 16 is bifurcated to engage the upper end of the lever 9.

When a screw 16*a* passing through the slot is loosened, the position of the contact piece 16 can be adjusted until the moment transmitted, to the reel 1 via belt 3 is large enough to maintain the magnetic tape 12 taut during the normal forward windnig operation. The crossed-over payoff belt 4, however, is not as taut, i.e., is relatively weakly tensioned, and exerts on the payoff reel 2 a moment which is opposite to the actual rotation resulting from the unwinding of the tape, so that the reel 2 has a certain braking force exerted on it. In this way, the tape 12 is maintained relatively taut in that portion of its reach extending between the reel 2 and the magnetic head unit, indicated generally at 13. The actual tape transport mechanism for moving the tape past the magnetic heads, such as the capstan and a counter pressure roller, are not shown, but are, as is conventional, close to or part of the unit 13.

For fast forward, the slide 10 is moved to the right, thereby displacing the shaft 5 leftwardly so that the belt 3 is made fully taut thereby to establish a substantially slippage-free driving connection between the shaft 5 and the takeup reel 1. The tension on belt 4, however, is reduced; in practice, the belt 4 is not allowed to go completely slack but still has sufficient tension to hold the tape 12 taut during the fast winding operation. It will be appreciated that it is quite in order that the tension on belt 4 be reduced inasmuch as, during the fast forward winding operation, the braking force acting on the payoff reel should be less than during normal recording or play-back operation.

During fast rewind, the slide 10 is moved leftwardly out of its central position and the shaft 5 is moved rightwardly, thereby tensioning the belt 4 while reducing the tension on belt 3. This will, for the reasons explained above, couple the shaft 5 to the payoff reel 2 so as to establish a substantially slippage-free drive, while the belt 3—which will now exert on the reel 1 a moment opposite to its direction of rotation—is loose enough to permit slippage but taut enough to exert such braking force as is desired.

In practice, it is expedient to provide a constant initial tension on the belts 3 and 4 only when, in the off position of the recorder, the shaft 5 is actually stopped, it being conventional ot provide such as off position in certain types of tape recorders, e.g., dictating machinery, which, while not a complete "off" position in the literal sense, is an off position in the sense that the tape transport mechanism is deactivated. Otherwise, additional tensioning means such as levers 20 should be provided which, during operation of the recorder, press against the belts and which, in the off position of the recorder, are moved out of engagement so as to leave the belts 3 and 4 relatively slack. The movement of these additional tensioning levers can be effected with the above-mentioned pivotal movement of the slide 10, i.e., the tensioning levers may be mechanically coupled with the slide 10 so as to be movable thereby when the slide is in its center position. This allows the tape recorder to be switched to an off position in which the tape transport mechanism is deactivated, the drive shaft 5, in the meantime, being kept in rotation. While the single figure shows both the tensioning means for turning off the motor 5', only one of these means will, generally, be needed.

It will be understood that the above description of the present invention is susceptible to various modifications, changes, and adaptations, and the same are intended to be comprehended within the meaning and range of equivalents of the appended claims.

What is claimed is:

1. A reel drive for use with magnetic tape recorders having a single-motor drive assembly and equipped with a payoff reel and a takeup reel, said tape recorder having a normal forward position for recording or playing back, a fast forward position for rapidly winding the tape from the payoff reel to the takeup reel, and a fast rewind position for rapidly rewinding the tape from the takeup reel to the payoff reel, the combination which comprises: a carrier carrying a drive shaft driven by said motor, said drive shaft being substantially symmetrical with respect to said reels, and first and second slipping belts for power-transmittingly connecting said drive shaft directly with said takeup and payoff reels, respectively; and means for pivoting said carrier with respect to said reels between normal forward, fast forward and fast rewind positions which said carrier occupies in the corresponding positions of the tape recorder, said normal forward position of said carrier being a position in which said belts are weakly tensioned thereby to provide enough pull and braking on the tape to maintain the same taut, said fast forward position of said carrier being a position in which said first belt is tight to establish a substantially slippage-free driving connection between said takeup reel and said drive shaft and the tension on said second belt which is less than it was while said carrier was in said normal forward position being sufficient to provide such belt with enough braking on the tape to maintain the same taut, and said fast rewind position of said carrier being a position in which said second belt is tight to establish a substantially slippage-free driving connection between said payoff reel and said drive shaft and the tension on said first belt which is less than it was while said carrier was in said normal forward position being sufficient to provide such belt with enough braking on the tape to maintain the same taut.

2. The combination defined in claim 1 wherein said drive shaft, in said fast forward position of said carrier, is further away from said takeup reel and closer to said payoff reel than it was while said carrier was in its normal forward position, and wherein said drive shaft, in said fast rewind position of said carrier, is further away from said payoff reel and closer to said takeup reel than it was while said carrier was in its normal forward position.

3. The combination defined in claim 1 wherein said carrier is adjustably mounted on the tape recorder, thereby to permit adjustment of the initial tension of said belts.

4. The combination defined in claim 2, further comprising means coacting with said carrier for moving the same between said positions thereof.

5. The combination defined in claim 4 wherein said moving means comprise a slide mounted for movement in the direction of its length, and lever means interposed between said slide and said carrier for pivoting the latter about its axis in response to longitudinal displacement of said slide.

6. The combination defined in claim 5, further comprising indexing means coacting with said moving means for defining three positions of said slide to correspond to said positions of said carrier.

7. The combination defined in claim 5 wherein said slide is mounted for pivotal movement about an axis passing through said slide.

8. The combination defined in claim 7 wherein said slide is pivotable about said axis, out of its normal position, to coact with means for stopping rotation of said drive shaft.

9. The combination defined in claim 7 wherein, when said carrier is in its normal forward position, said belts are held in said weakly tensioned condition by tensioning means bearing against the respective belts, and wherein said slide is pivotable about said axis, out of its normal position, to coact with means for moving said tensioning means out of engagement with said belts, thereby to allow continued rotation of said drive shaft while interrupting the power transmission via said belts.

References Cited

UNITED STATES PATENTS

| | | | |
|---|---|---|---|
| Re. 22,970 | 2/1948 | Begun | 242—75.4 X |
| 2,658,952 | 10/1953 | Harsant et al. | 242—55.12 X |
| 2,855,160 | 10/1958 | Fundingsland | 242—55.14 |
| 2,965,323 | 12/1960 | Foster | 242—55.12 |
| 3,000,583 | 9/1961 | Hoskin | 242—55.12 |

FRANK L. COHEN, *Primary Examiner.*

G. F. MAUTZ, *Assistant Examiner.*

UNITED STATES PATENT OFFICE

CERTIFICATE OF CORRECTION

Patent No. 3,332,635 July 25, 1967

Eduard Schüller et al.

It is hereby certified that error appears in the above numbered patent requiring correction and that the said Letters Patent should read as corrected below.

In the heading to the printed specification, line 5, for "Elisabethenstrasse" read -- Ulm/Donau --.

Signed and sealed this 20th day of August 1968.

(SEAL)
Attest:

Edward M. Fletcher, Jr.
Attesting Officer

EDWARD J. BRENNER
Commissioner of Patents